INVENTOR
Ovide TELLIER

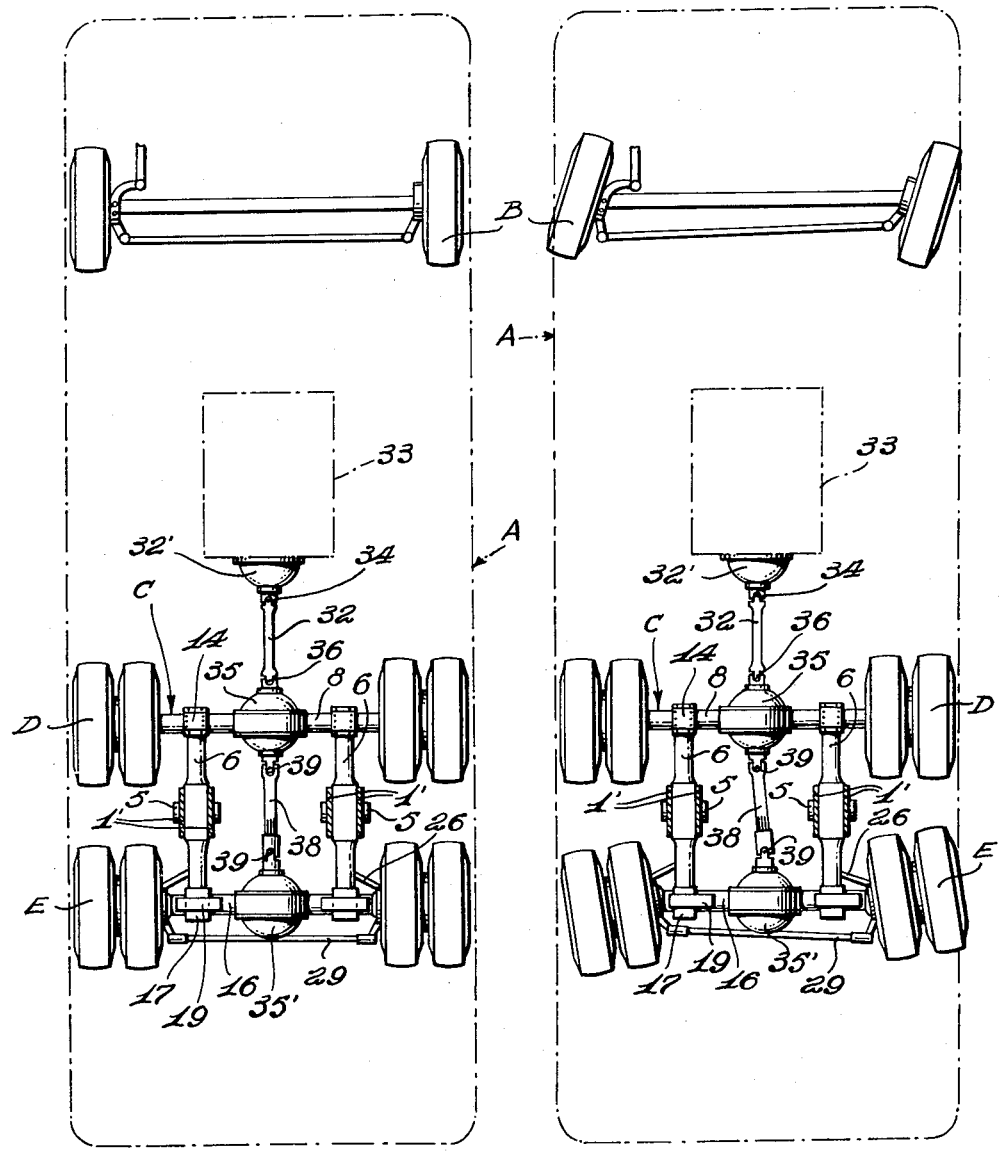

BY

ATTORNEYS

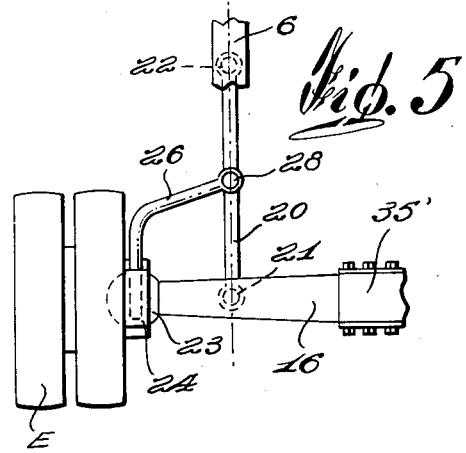
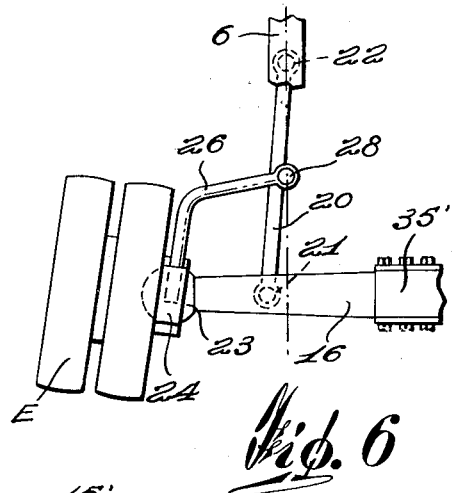
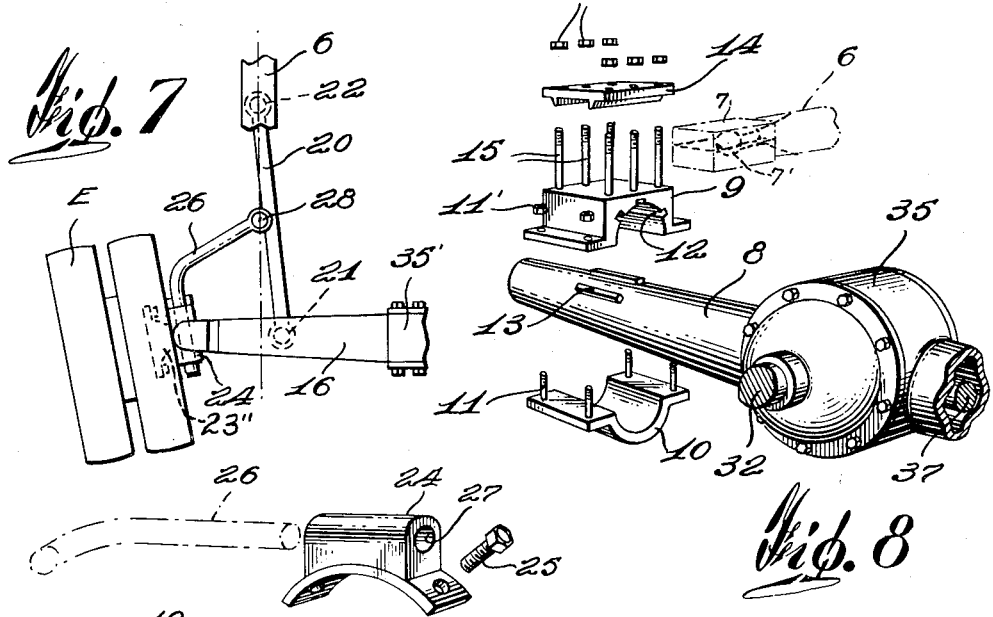
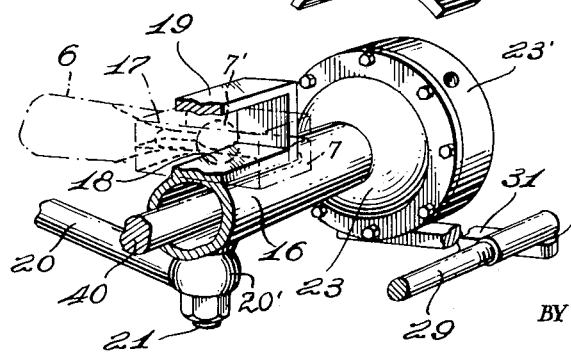

United States Patent Office 2,985,251
Patented May 23, 1961

2,985,251
TANDEM UNDERCARRIAGE
Ovide Tellier, Notre Dame du Sacre Coeur,
Quebec, Canada
Filed Feb. 9, 1959, Ser. No. 791,908
5 Claims. (Cl. 180—22)

The present invention relates to undercarriages for vehicles and more particularly to a two axled undercarriage for motor vehicles, such as trucks and the like, and also for semi-trailers.

The main object of the present invention is the provision of an undercarriage of the character described in which one pair of wheels is mounted for steering movement so as to eliminate wear of the tires due to sideways slipping, thereby insuring a much longer tire life.

An object of the present invention is the provision of an undercarriage of the character described in which the rear wheels of the tandem arrangement will smoothly follow the curved path travelled by the front wheels when the vehicle makes a turn, and this is effected automatically without control from the driver.

Another important object of the present invention is the provision of an undercarriage of the character described in which the front wheels of the tandem arrangement are secured against movement in a horizontal plane, while only the rear wheels of the tandem arrangement are mounted for steering movement, thereby resulting in a much safer arrangement than undercarriages of the tandem type in which the front wheels of the tandem are mounted for steering movement.

Yet another important object of the present invention is the provision of an undercarriage of the character described in which the steering wheels will not project laterally of the vehicle to any substantial amount when the latter makes a turn.

Still another important object of the present invention is the provision of an undercarriage of the character described adapted to be mounted at the rear end of a motor vehicle and in which the two pairs of wheels are driving wheels.

Still another important object of the present invention is the provision of an undercarriage of the character described which is relatively simple in construction, having a minimum of moving parts.

The foregoing and other important objects of the present invention will become more apparent during the following disclosure and by referring to the drawings in which:

Figure 1 is a diagrammatic top plan view of the wheel arrangement of a motor vehicle shown in the position when travelling in a straight direction;

Figure 2 is a view similar to that of Figure 1, but showing the position of the wheels when making a right turn;

Figure 5 is a partial diagrammatic plan view of a self-steering rear wheel of the undercarriage shown when travelling in a straight direction;

Figure 6 is a view similar to that of Figure 5, in which the wheel makes a left hand turn;

Figure 7 is a view of a modified embodiment in which the rear wheel is idle, shown when the wheel makes a right hand turn;

Figure 8 is a partial exploded perspective view of the front axle of the undercarriage and showing the means for securing said front axle to the main arms of the frame of the undercarriage; and Figure 9 is an exploded partial perspective view of the rear axle of the undercarriage showing the means for mounting said rear axle at the rear ends of the main arms of the frame of the undercarriage.

Figure 3:
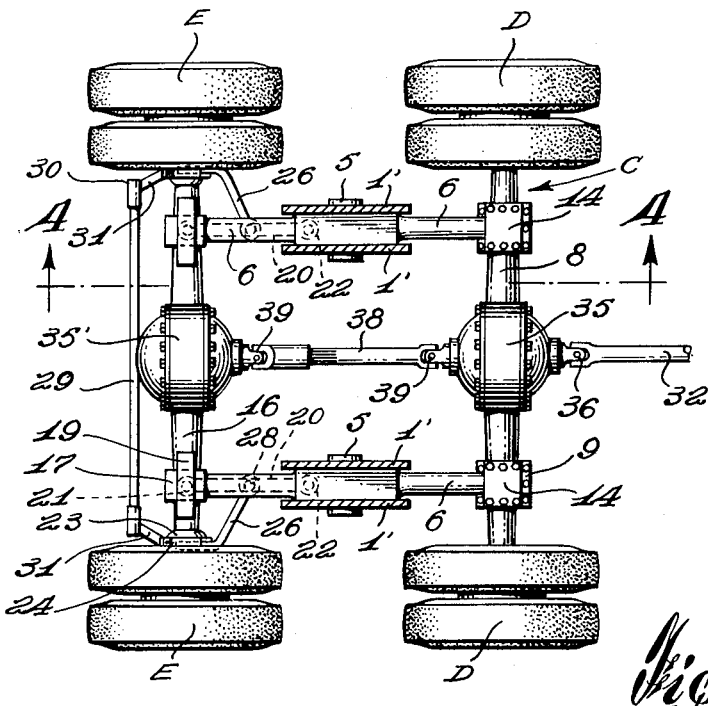
Figure 3 is a partial top plan view of the undercarriage taken on line 3—3 of Fig. 4, some parts being shown in section.

Referring now more particularly to the drawings in which like reference characters indicate like elements throughout, reference character A indicates a motor vehicle such as a truck, a bus or the like, provided with conventional front steering wheels B and at the back thereof with the undercarriage C according to the present invention.

The undercarriage C provides tandem supporting and driving wheels, namely, a front pair of wheels D and a rear pair of wheels E. Of course the wheels of each pair may be double wheels as illustrated.

Figure 4:
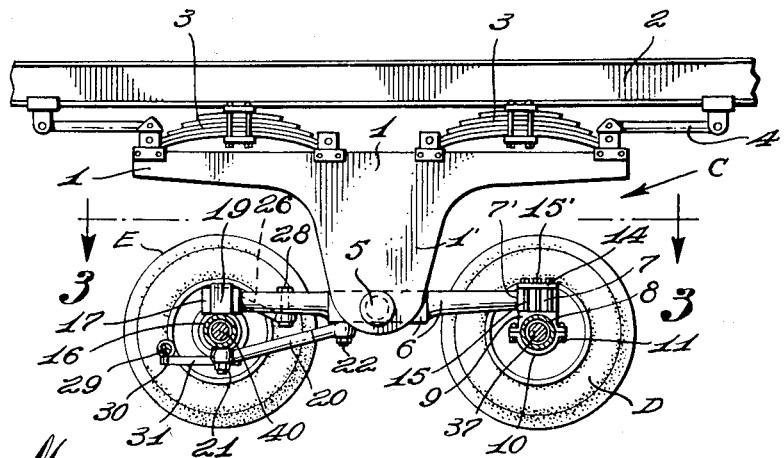
Figure 4 is a side elevation of the undercarriage taken on line 4—4 of Fig. 3.

Referring to Figures 3 and 4, the undercarriage C, according to the present invention, comprises a rectangular frame 1 which supports the frame 2 of the vehicle by the interposition of leaf springs 3 and radius rods 4, the latter absorbing the force exerted between the vehicle and the undercarriage during braking and accelerating movements.

The frame 1 is provided intermediate its ends and on each side thereof with downwardly extending double walled projections 1' at the lower end of which are mounted transverse axles 5 which are pivots for two longitudinally extending rocking arms 6. The rocking arms 6 are parallel to each other and are mounted against movement in a horizontal plane, said arms being only adapted to rock about the axles 5 in vertical planes parallel to the vertical plane passing through the longitudinal axis of the body of the vehicle A.

At the front end portion of each arm 6, a rectangularly shaped block 7 is attached by means of a swivel joint 7'. Each block 7 is rigidly secured to the housing 8 of the axle of the front wheels D by means shown in more detail in Figure 8. Said means comprise upper and lower clamping members 9 and 10, respectively, adapted to surround and be clamped onto the axle housing 8 by means of bolts and nuts 11 and 11'. The clamping members 9 and 10 are held against rotation relative to the housing 8 by being provided with keyways 12 adapted to receive keys 13 which are secured to the housing 8. The rectangular end block 7 of the rocking arm 6 is secured on top of the clamping member 9 by a securing plate 14 which is held on the clamping member 9 by means of bolts 15 and nuts 15'.

The rear axle housing or support member 16 is disposed transversely of the vehicle parallel to the front axle housing 8. The rear axle housing 16 is disposed underneath the back rectangularly shaped blocks 17 which are secured to the rear ends of the rocking arms 6 by means of swivel joint 7'. The underface of each end block 17 is adapted to slide on a bearing face 18 formed on the top of the housing 16, and the transverse movement of the axle housing 16 relative to the arms 6 is limited by the provision of a strap member 19, which surrounds the end block 17 but provides substantial space between the side faces of said end block 17 and the side walls of the strap member 19. Thus the axle housing 16 is capable of limited axial displacement transversely of the longitudinal axis of the vehicle A. Rods 20 having a swivel joint 20', extend underneath the arms 6 and have their rear ends pivotally secured underneath the rear axle housing 16, as shown at 21, and their forward ends pivotally secured underneath the rocking arms 6 just behind the axles 5, as shown at 22. The rods 20 serve to maintain the rear axle housing 16 parallel to the front axle housing 8 in all the transverse positions of the rear axle housing 16 with respect to the arms 6. The rods 20 serve also to resist the torque imparted to the rear axle housing 16 by the driving wheels E. The arms 6, the rear axle housing 16 and the radius rod 20 form a deformable parallelogram arrangement.

From the above description, it will be understood that, if the vehicle traversed terrain which would bring about the dropping into a depression of the lower wheels D, in Fig. 3, while simultaneously raising the upper wheels D, the rocking beams 6 would then assume a position wherein the rear end of the lower beam and the front end of the upper beam would enter into the plane of the paper, while the front end of the lower beam and the rear end of the upper beam would be raised out of the plane of the paper. The foregoing would cause axles 8 and 16 to tilt about a longitudinal axis with the axle 8 pivoting in a direction opposite to the pivoting of axle 16.

Conventional ball joints 23 are mounted at both ends of the rear axle housing 16 and serve to connect the rear wheels E for steering movement, while permitting said rear wheels E to be connected to the transmission of the motor vehicle. The pivoted part 23' of the ball joint 23 is provided with a sleeve member 24 which is rigidly secured thereto by bolts 25 and is adapted to slidably receive in its bore 27, the rear end of a crank-shaped steering rod 26 which has its forward end pivotally mounted at 28 on the rocking arm 6 behind the axle 5.

The pivoted parts 23' of the ball joints 23, at both ends of the rear axle housing 16, are interconnected by means of an adjustable link 29 which is pivoted at 30 to a rearwardly extending arm 31 rigidly secured to the part 23'.

Referring to Figures 5, 6 and 7, it will be seen that each steering rod 26 is so adjusted that the rear wheel E will be in a plane parallel to the longitudinal axis of the vehicle when the rear axle housing 16 is in its middle position with respect to the arms 6. Upon turning movement of the vehicle to the left, the rear axle housing 16 is displaced to the left transversely of the vehicle whereby the rear wheels E effect a steering movement under the action of the steering rods 26, the forward ends of which are pivotally mounted directly on the arms 6. The reverse movement is effected when the vehicle turns to the right.

The rear ends of the steering rods 26 are axially slidable in the sleeve members 24 to allow for the variation of the distance between the pivot points 28 and the connection of the rods 26 to the part 23' of the ball joints 23 during transverse displacement of the rear axle housing 16 with respect to the arms 6.

It will be noted that during turning movement of the vehicle, the transverse displacement of the housing 16 is relatively limited so that at no time will the rear wheels E project laterally of the vehicle to any substantial amount.

It will be also noted that the distance separating the front wheels D from the rear wheel E may be made greater or smaller than illustrated within certain limits, in which case the length of the arms 20 and steering rods 26 will be varied accordingly so as to obtain a proportional steering movement of the rear wheels E.

The rear axle housing 16 is transversely displaced, during turning movement of the vehicle, due to the friction between the rear wheels and the road surface, said friction being considerably greater than the friction between the lubricated contacting faces of the rear blocks 17 of the arms 6 and the bearing faces 18 shown in Figure 9.

The vehicle may also back up while making a turn and the rear wheels will accomplish their proper steering movement in exactly the same manner as when going forward.

In the drawings, both pairs of wheels D and E are driving wheels, and the transmission consists of the transmission shaft 32 connected to the transmission 32' of the engine 33 by means of the universal joint 34, and to the differential 35 of the front pair of wheels D by means of the universal joint 36. The differential 35 is connected to the wheels D by means of the driving shaft 37, as shown in Figure 8. The differential 35 is also directly connected to the rear differential 35' of the rear wheels E by means of the extensible transmission shaft 38 provided with universal joints 39. The driving shaft 40 of the rear wheels is shown in Figure 9, and is connected to the differential 35'.

It is understood that both pairs of wheels D and E may be idle wheels to be used in conjunction with a semi-trailer, or only the front wheels D may be driving wheels while the rear wheels would be idle wheels.

In both these latter applications, it will be understood that the ball joints 23 will be replaced by conventional hinges 23'' as shown in Fig. 7 such as used for the front wheels of a motor vehicle.

With the arrangement according to the present invention, the rear wheels D will always smoothly follow the arcuate path travelled by the front wheels D of the undercarriage, and when said undercarriage is used in conjunction with a semi-trailer, jackknife of the semi-trailer will be prevented.

While a preferred embodiment according to the present invention has been illustrated and described, it is understood that various modifications may be resorted to without departing from the spirit and scope of the appended claims.

I claim:
1. A tandem wheel undercarriage for vehicles comprising a first pair of spaced longitudinally extending arms pivotally mounted about horizontal axes intermediate their ends underneath said vehicle and secured to said vehicle against movement in a horizontal plane, a front axle secured to the front ends of said arms, a pair of front wheels rotatively mounted on said front axle and secured against movement in a horizontal plane, a rear axle transversely extending underneath the rear ends of said first pair of arms and abutting against but unattached to the underface of the latter, strap members fixed to said rear axle and freely surrounding each arm of said pair of arms, rear wheels mounted on said rear axle at the ends thereof for steering movement with respect to said rear axle, second arms pivotally mounted on said first pair of arms forwardly of said rear axle and pivotally connected to said rear axle so as to maintain said rear axle substantially parallel to said front axle, and steering rods pivotally connected to said first pair of arms forwardly of said rear axle, means attaching said steering rods to said rear wheels, so constructed and arranged that turning movement of said vehicle will cause transverse displacement of said rear axle relative to the vehicle and steering movement of said rear wheels relative to said vehicle so that said rear wheels will smoothly follow the arcuate path travelled by the front pair of wheels.

2. A tandem wheel undercarriage as claimed in claim 1, wherein at least said front pair of wheels are driving wheels.

3. A tandem wheel undercarriage as claimed in claim 1, wherein said front and rear pairs of wheels are driving wheels.

4. A tandem wheel undercarriage as claimed in claim 1, further including a frame secured underneath said vehicle against movement in a horizontal plane with respect to said vehicle, said first pair of arms being pivotally mounted on said frame intermediate their ends for movement in vertical planes.

5. A tandem wheel undercarriage as claimed in claim 1, wherein said steering rods are mounted for axial slidable movement with respect to said rear wheels.

References Cited in the file of this patent

UNITED STATES PATENTS

| | | |
|---|---|---|
| 1,391,834 | Kerlin | Sept. 27, 1921 |
| 1,571,748 | Wilson | Feb. 2, 1926 |
| 1,871,734 | Prins | Aug. 16, 1932 |
| 2,117,784 | Allin | May 17, 1938 |
| 2,367,151 | Stephen | Jan. 9, 1945 |